(12) United States Patent
Walton et al.

(10) Patent No.: US 7,747,271 B2
(45) Date of Patent: Jun. 29, 2010

(54) RADIATED POWER CONTROL FOR A MULTI-ANTENNA TRANSMISSION

(75) Inventors: Jay Rodney Walton, Carlisle, MA (US); Xiangdong Zhang, Westford, MA (US)

(73) Assignee: QUALCOMM Incorporated, San Diego, CA (US)

( * ) Notice: Subject to any disclaimer, the term of this patent is extended or adjusted under 35 U.S.C. 154(b) by 773 days.

(21) Appl. No.: 11/070,734

(22) Filed: Mar. 2, 2005

(65) Prior Publication Data

US 2006/0199604 A1 Sep. 7, 2006

(51) Int. Cl.
*H01Q 11/12* (2006.01)
(52) U.S. Cl. .................... 455/522; 455/39; 455/500; 455/68; 455/69
(58) Field of Classification Search ............ 455/63.4, 455/39, 500, 507, 517, 522, 127.1, 91, 68, 455/69
See application file for complete search history.

(56) References Cited

U.S. PATENT DOCUMENTS

| | | | | |
|---|---|---|---|---|
| 6,148,219 | A * | 11/2000 | Engelbrecht et al. | 455/456.2 |
| 6,239,747 | B1 * | 5/2001 | Kaminski | 342/442 |
| 6,240,098 | B1 * | 5/2001 | Thibault et al. | 370/431 |
| 6,799,026 | B1 * | 9/2004 | Scherzer et al. | 455/279.1 |
| 6,873,606 | B2 * | 3/2005 | Agrawal et al. | 370/310 |
| 7,076,263 | B2 * | 7/2006 | Medvedev et al. | 455/522 |
| 7,245,880 | B1 * | 7/2007 | Jacobsen | 455/69 |
| 7,280,625 | B2 * | 10/2007 | Ketchum et al. | 375/343 |
| 7,385,914 | B2 * | 6/2008 | Choi et al. | 370/203 |
| 2003/0157954 | A1 * | 8/2003 | Medvedev et al. | 455/522 |
| 2004/0023621 | A1 * | 2/2004 | Sugar et al. | 455/103 |

FOREIGN PATENT DOCUMENTS

| | | |
|---|---|---|
| RU | 2163052 | 2/2001 |
| WO | 9427381 | 11/1994 |
| WO | 9521494 | 8/1995 |
| WO | WO 02/19562 | 3/2002 |

(Continued)

OTHER PUBLICATIONS

P.D. Karaminas et al, "Beamforming type base station power control for personal communication networks", Electronics Letters, vol. 32, No. 23, Nov. 7, 1996, pp. 2111-2112.*

(Continued)

*Primary Examiner*—Walter Benson
*Assistant Examiner*—David S Luo
(74) *Attorney, Agent, or Firm*—Thien T. Nguyen; Ross L. Franks

(57) ABSTRACT

To meet a radiated power limit, a transmitting station determines a synthesized antenna pattern based on steering vectors used for spatial processing and estimates an array gain based on the synthesized antenna pattern. Different spatial processing modes (e.g., eigensteering and spatial spreading) result in different synthesized antenna patterns. The array gain may be estimated based on the spatial processing mode used for the data transmission and applicable parameters (e.g., eigenvalues) for that mode. An element gain for each antenna used for data transmission may also be estimated. The transmitting station then limits the transmit power for the data transmission based on the array gain, the element gain, and the radiated power limit, which may be an effective isotropic radiated power (EIRP) limit imposed by a regulatory agency.

34 Claims, 4 Drawing Sheets

FOREIGN PATENT DOCUMENTS

WO          02080400        10/2002

OTHER PUBLICATIONS

Karaminas P.D. et al., "Beemforming-type base station power control for personal communication networks" Electronics Letters, IEE Stevenage, GB, vol. 32, No. 23, Nov. 7, 1996 pp. 2111-2112.

International Search Report PCT/US06/007811, International Search Authority European Patent office Jun. 21, 2006.

Written Opinion PCT/US06/007811, International Search Authority European Patent office Sep. 2, 2007.

International Preliminary Exam Report PCT/US06/007811, International Search Authority European Patent office Sep. 11, 2007.

* cited by examiner

RADIATED POWER CONTROL FOR A MULTI-ANTENNA TRANSMISSION

BACKGROUND

I. Field

The present invention relates generally to communication, and more specifically to techniques for controlling radiated power for a multi-antenna transmission.

II. Background

Wireless communication networks are widely deployed to provide various communication services such as data, voice, video, and so on. These networks include wireless wide area networks (WWANs) that provide communication coverage for large geographic areas (e.g., cities), wireless local area networks (WLANs) that provide communication coverage for medium-size geographic areas (e.g., buildings and campuses), and wireless personal area networks (WPANs) that provide communication coverage for small geographic areas (e.g., homes). A wireless network typically includes one or more access points (or base stations) that support communication for one or more user terminals (or wireless devices).

A wireless communication network typically operates in a designated frequency band. In the United States, the Federal Communications Commission (FCC) is a regulatory agency that restricts radiated power levels for various frequency bands to facilitate efficient use of these frequency bands and to avoid excessive RF interference. For example, an IEEE 802.11 WLAN typically operates in a U-NII band that covers 5.15 to 5.35 gigaHertz (GHz) and 5.725 to 5.825 GHz. Although the U-NII band is unlicensed, a wireless station (which may be an access point or a user terminal) needs to limit its radiated power in any spatial direction to within a level mandated by the FCC in order to qualify for operation in the U-NII band.

In general, it is desirable to use as much transmit power as possible in order to improve the signal-to-noise-and-interference ratio (SNR) for a data transmission and/or to extend the range of operation. A higher SNR can support a higher data rate and/or improve reliability for the data transmission. The radiated power in a given direction is determined by the amount of transmit power applied to the antenna(s) at a wireless station and an antenna pattern formed by the antenna(s). If the wireless station is equipped with multiple antennas, then these antennas may be used to synthesize an antenna pattern that increases the radiated power in a specific spatial direction, e.g., toward a receiving station. In general, the antenna pattern is often not easy to ascertain because it is dependent on various factors such as the physical attributes of each antenna, the layout and arrangement of the antennas, and so on. If the antenna pattern is not known, then the wireless station may assume a maximum possible gain for the antenna pattern and may set the transmit power level accordingly in order to meet regulatory limit. However, in many instances, the maximum gain is not achieved for any spatial direction, and setting the transmit power level based on this maximum gain results in a lower SNR and/or reduced range, both of which are undesirable.

There is therefore a need in the art for techniques to control radiated power for a multi-antenna transmission.

SUMMARY

Techniques for controlling the radiated power for a data transmission sent from multiple antennas to meet a radiated power limit are described herein.

According to one aspect of the invention, a method of controlling radiated power for a data transmission is described in which an array gain is estimated based on a synthesized antenna pattern for the data transmission, and the transmit power for the data transmission is limited based on the array gain and a radiated power limit.

According to another aspect of the invention, an apparatus in a wireless communication network is described which includes a controller to estimate an array gain based on a synthesized antenna pattern for a data transmission and a control unit to limit transmit power for the data transmission based on the array gain and a radiated power limit.

According to another aspect of the invention, an apparatus is described which includes means for estimating an array gain based on a synthesized antenna pattern for a data transmission and means for limiting transmit power for the data transmission based on the array gain and a radiated power limit.

Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
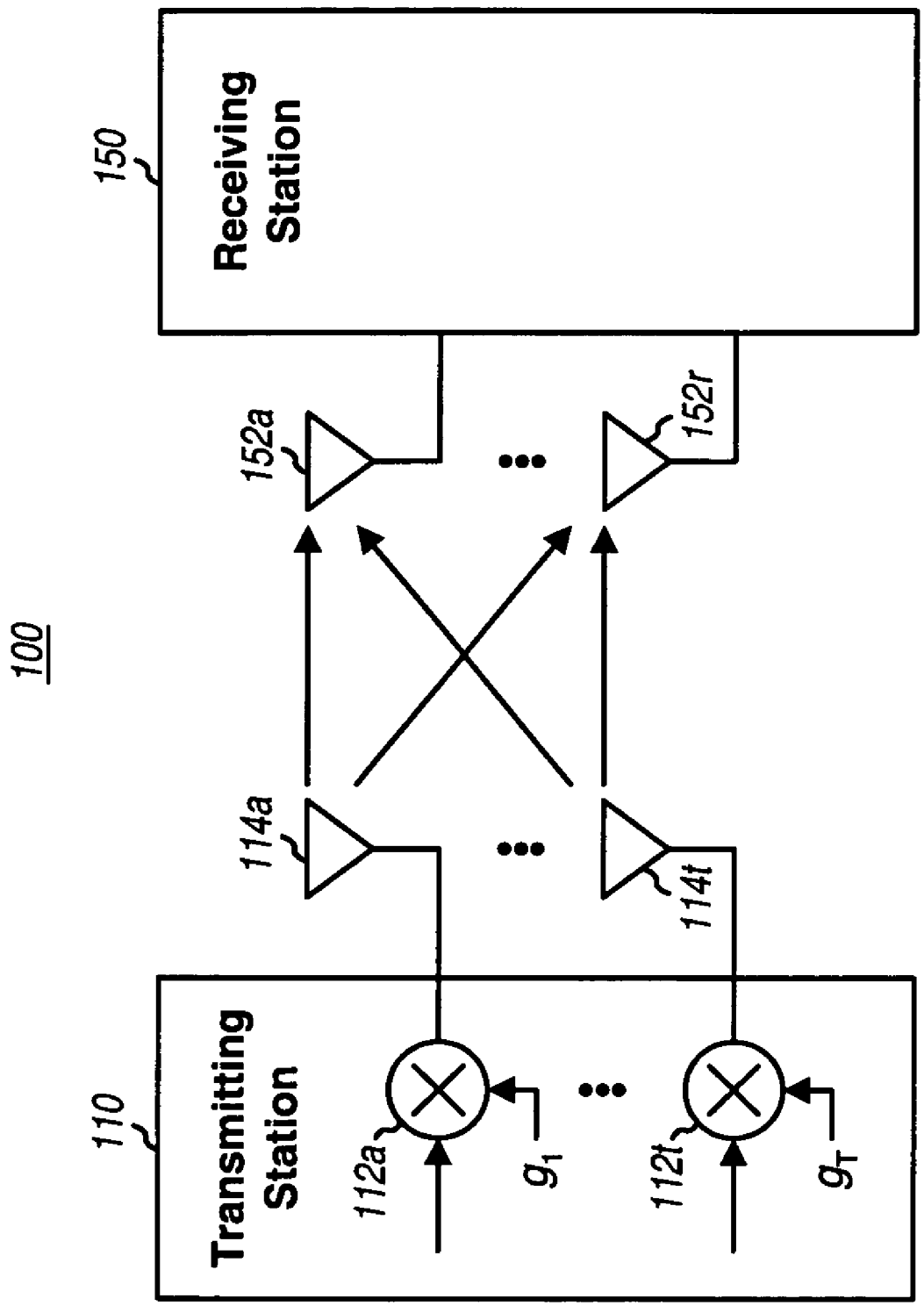
FIG. 1 shows a transmitting station and a receiving station.

FIG. 1 shows a wireless communication network 100 with a transmitting station 110 equipped with multiple (T) antennas 114a through 114t and a receiving station 150 equipped with multiple (R) antennas 152a through 152r. An antenna may also be called an antenna element, a radiation element, and so on. For simplicity, FIG. 1 shows transmitting station 110 performing spatial processing by multiplying the symbols for each transmit antenna i with a single complex gain $g_i$ by a multiplier 112. In general, the spatial processing may be more complex, as described below. The outputs of multipliers 112a through 112t are further processed and transmitted from T transmit antennas 114a through 114t, respectively.

The radiated power of a transmit antenna array typically has different intensities in different spatial directions. The time-averaged power density of the power radiated from the transmit antenna array may be given by the real part of a Poynting vector, as follows:

$$\rho(\theta, \phi) = \frac{1}{2} \text{Re}\{\vec{E} \times \vec{H}\} = \frac{1}{2} \frac{|E_{total}(\theta, \phi)|^2}{\eta}, \qquad \text{Eq (1)}$$

where $\rho(\theta,\phi)$ is the time-averaged power density for the transmit antenna array;

H is the magnetic field strength for the transmit antenna array;

$\eta$ is the impedance of free space, which is equal to $120\pi$; and $E_{total}(\theta,\phi)$ is the total electric field strength for the transmit antenna array.

The total electric field strength $E_{total}(\theta,\phi)$ and the time-averaged power density $\rho(\theta,\phi)$ may be expressed as functions of spatial directions, with $\theta$ being the angle for azimuth (or horizontal rotation) and $\phi$ being the angle for elevation (or vertical rotation). For a single antenna, the electric field $E(\theta,\phi)$ is dependent on the design of the transmit antenna. For example, different electric field patterns are obtained for a dipole antenna, a whip antenna, a planar antenna, and so on. For an antenna array with multiple radiation elements used for transmission, the total electric field $E_{total}(\theta,\phi)$ is the sum of the complex electric field $E_i(\theta,\phi)$ from each radiation element.

The total radiated power (TRP) from the antenna array may be obtained by integrating the total time-averaged power density across the surface of a reference sphere, as follows:

$$TRP = \int_{\theta=0}^{\pi}\int_{\phi=0}^{2\pi} \rho(\theta,\phi) \cdot r^2 \cdot d\theta \cdot d\phi. \qquad \text{Eq (2)}$$

The total radiated power is indicative of the total power radiated from the T transmit antennas in all spatial directions.

The effective isotropic radiated power (EIRP) from the antenna array may be computed as follows:

$$EIRP = \int_{\theta=0}^{\pi}\int_{\phi=0}^{2\pi} \rho_{max} \cdot r^2 \cdot d\theta \cdot d\phi, \qquad \text{Eq (3)}$$

where $\rho_{max}$ is the maximum value for the total time-averaged power density $\rho(\theta,\phi)$ over entire range of $\theta$ and $\phi$. The EIRP is the power required for an isotropic antenna (which radiates the same power in all spatial directions) to generate the same field in all directions as the maximum field from the antenna array.

The maximum directivity of the antenna array, D, may be expressed as:

$$D = \frac{EIRP}{TRP}. \qquad \text{Eq (4)}$$

The maximum gain of the antenna array, which is also called the total array gain $G_{total}$, may be expressed as:

$$G_{total} = \frac{EIRP}{P_{tx}} = D \cdot \varepsilon, \qquad \text{Eq (5)}$$

where $\varepsilon$ is the efficiency of the antenna array and $P_{tx}$ is the total transmit power feeding all elements of the transmit antenna array.

The FCC defines specific limits on the EIRP for a wireless station operating in the U-NII band. If the total array gain $G_{total}$ is known or can be computed, then the total transmit power $P_{tx}$ can be adjusted such that the wireless station meets the EIRP limits imposed by the FCC. However, as shown in equations (1) through (5), the total array gain $G_{total}$ is not easy to compute or determine.

The EIRP of the antenna array is dependent on the maximum value of the total time-averaged power density $\rho(\theta,\phi)$, or $\rho_{max}$, which in turn is dependent on the maximum value of the total electric field $E_{total}(\theta,\phi)$. From equation (1), $\rho_{max}$ may be expressed as:

$$\rho_{max} = \frac{1}{2}\frac{|E_{max}|^2}{\eta}, \qquad \text{Eq (6)}$$

where $E_{max}$ is the maximum of $E_{total}(\theta,\phi)$. $E_{max}$ is dependent on a complex gain $g_i$ and an electric field pattern $K_i(\theta,\phi)$ for each of the T transmit antennas in the array and may be expressed as:

$$E_{max} = \max\left(\sum_{i=1}^{T} E_i(\theta,\phi)\right) \qquad \text{Eq (7)}$$
$$= \max\left(\sum_{i=1}^{T} g_i \cdot e^{jk_0 \cdot R_i \cdot U_i} \cdot K_i(\theta,\phi)\right),$$

where
  $k_0$ is a free space wave vector;
  $R_i$ is a vector pointing from a phase reference point to transmit antenna i; and
  $U_i$ is a unit vector pointing from the phase reference point to a far-field point.

For simplicity, all radiation elements in the antenna array may be assumed to have the same radiation pattern, so that $K_i(\theta,\phi)=K(\theta,\phi)$ for i=1, . . . , T. In this case, $E_{max}$ may be estimated as follows:

$$E_{max} \leq \max\left(\sum_{i=1}^{T} g_i \cdot e^{jk_0 \cdot R_i \cdot U_i}\right) \cdot \max(K(\theta,\phi)). \qquad \text{Eq (8)}$$

The term max $$\left(\sum_{i=1}^{T} g_i \cdot e^{jk_0 \cdot R_i \cdot U_i}\right)$$

corresponds to the gain of the antenna array (or array gain) which may be denoted as $G_{array}$. The array gain may also be called an array factor, a steering gain, and so on. The term max $(K(\theta,\phi))$ corresponds to the gain of an individual radiation element (or element gain) which may be denoted as $G_{ant}$.

The element gain $G_{ant}$ is indicative of how well a given transmit antenna increases the effective radiated power in a particular spatial direction in comparison to an isotropic antenna. The total array gain $G_{total}$ may be estimated using equation (8), as follows:

$$G_{total} \leq G_{array} \cdot G_{ant}. \qquad \text{Eq (9)}$$

To ensure meeting the EIRP limit for a given operating scenario, the total array gain may be conservatively estimated as follows:

$$G_{total,dB} \approx 10 \cdot \log_{10}(T) + G_{ant,dBi}, \qquad \text{Eq (10)}$$

where
- $G_{ant,dBi}$ is the gain of an antenna element given in units of decibels (dBi); and
- $G_{total,dB}$ is the total array gain given in units of dB.

dBi is equal to 10 times the logarithm (in base 10) of the electric field intensity of the transmit antenna divided by the electric field intensity of the isotropic antenna at the same distance. For T=4, the array gain may be given as $G_{array,dB}=10 \log_{10}(T)=6.02$ dB. The element gain $G_{ant,dBi}$ may not be known. In this case, an assumption may be made for the element gain. For example, an element gain of 2 dBi may be assumed for an omni-directional antenna. Thus, $G_{total,dB}$ is 8 dB in the above example with T=4.

The transmit power may be limited as follows:

$$P_{tx,dBm} \leq EIRP_{limit,dBm} - G_{total,dB} = EIRP_{limit,dB} - 10 \cdot \log_{10}(T) - G_{ant,dBi}, \quad \text{Eq (11)}$$

where
- $EIRP_{limit,dBm}$ is the EIRP limit given in units of dBm; and
- $P_{tx,dBm}$ is the total transmit power applied to the transmit antenna array also given in units of dBm.

dBm is a logarithmic unit of power, with 0 dBm being equal to 1 milliwatt (mW).

Equation (11) indicates that the total transmit power applied to the antenna array may be reduced by the total array gain $G_{total,dB}$ in order to ensure that the EIRP limit is met. In many instances, the total array gain estimated by equation (10) is not realized. This implies that limiting the transmit power as shown in equation (11) is a conservative strategy that can result in reduced range and/or data rate. Improved performance may be achieved by estimating the total array gain in a more accurate manner (e.g., based on a synthesized antenna pattern) and reducing the transmit power by an amount proportional to this total array gain. This adaptive strategy can allow a wireless station to operate closer to the EIRP limit, which can improve range and/or data rate.

In network 100, a multiple-input multiple-output (MIMO) channel formed by the T transmit antennas and the R receive antennas may be characterized by an R×T channel response matrix $\underline{H}$. This matrix $\underline{H}$ may be given as:

$$\underline{H} = \begin{bmatrix} h_{1,1} & h_{1,2} & \cdots & h_{1,T} \\ h_{2,1} & h_{2,2} & \cdots & h_{2,T} \\ \vdots & \vdots & \ddots & \vdots \\ h_{R,1} & h_{R,2} & \cdots & h_{R,T} \end{bmatrix}, \quad \text{Eq (12)}$$

where entry $h_{j,i}$, for j=1 . . . R and i=1 . . . T, denotes the coupling or complex channel gain between transmit antenna i and receive antenna j.

The channel response matrix $\underline{H}$ may be diagonalized to obtain multiple (S) eigenmodes of $\underline{H}$, where $S \leq \min\{T, R\}$. The eigenmodes may be considered as orthogonal spatial channels of the MIMO channel. The diagonalization may be achieved by performing either singular value decomposition of $\underline{H}$ or eigenvalue decomposition of a correlation matrix of $\underline{H}$. The eigenvalue decomposition may be expressed as:

$$\underline{R} = \underline{H}^H \cdot \underline{H} = \underline{E} \cdot \underline{\Lambda} \cdot \underline{E}^H, \quad \text{Eq (13)}$$

where
- $\underline{R}$ is a T×T correlation matrix of $\underline{H}$;
- $\underline{E}$ is a T×T unitary matrix whose columns are eigenvectors of $\underline{R}$;
- $\underline{\Lambda}$ is a T×T diagonal matrix of eigenvalues of $\underline{R}$; and
- "$H$" denotes a conjugate transpose.

The unitary matrix $\underline{E}$ is characterized by the property $\underline{E}^H \cdot \underline{E} = \underline{I}$, where $\underline{I}$ is the identity matrix. The columns of a unitary matrix are orthogonal to one another, and each column has unit power. The diagonal matrix $\underline{\Lambda}$ contains possible non-zero values along the diagonal and zeros elsewhere. The diagonal elements of $\underline{\Lambda}$ are eigenvalues of $\underline{R}$ and represent the power gains for the S eigenmodes of $\underline{H}$. The eigenvalues may be ordered or sorted such that $\lambda_1 \geq \lambda_2 \geq \ldots \geq \lambda_S$, where $\lambda_1$ is the largest eigenvalue and $\lambda_S$ is the smallest eigenvalue. The largest eigenvalue $\lambda_1$ is also called the principal eigenvalue $\lambda_{pem}$, and the eigenmode corresponding to $\lambda_1$ is called the principal eigenmode. When the eigenvalues are ordered, the columns of $\underline{E}$ are ordered correspondingly so that the first column of $\underline{E}$ is associated with the largest eigenvalue and the last column of $\underline{E}$ is associated with the smallest eigenvalue.

For a time division duplexed (TDD) network, the downlink (or forward link) and the uplink (or reverse link), which are the communication links between an access point and a user terminal, share the same frequency band. In this case, the downlink and uplink channel responses may be assumed to be reciprocal of one another, after calibration has been performed to account for differences in the transmit and receive chains at the access point and the user terminal. That is, if $\underline{H}$ represents the channel response matrix from antenna array A to antenna array B, then a reciprocal channel implies that the coupling from array B to array A is given by $\underline{H}^T$, where $\underline{H}^T$ denotes the transpose of $\underline{H}$. For the TDD network, the transmitting station may estimate $\underline{H}$ based on a pilot received from the receiving station and may decompose $\underline{H}$ to obtain $\underline{E}$ and $\underline{\Lambda}$. For a frequency division duplexed (FDD) network, the downlink and uplink are allocated different frequency bands, and the downlink channel response matrix may not be well correlated with the uplink channel response matrix. For the FDD network, the receiving station may estimate $\underline{H}$ based on the pilot received from the transmitting station, decompose $\underline{H}$ to obtain $\underline{E}$ and $\underline{\Lambda}$, and send $\underline{E}$ and $\underline{\Lambda}$ or equivalent information back to the transmitting station.

The transmitting station may transmit data using eigensteering to improve performance. With eigensteering, the transmitting station uses the eigenvectors in $\underline{E}$ to transmit data on one or more eigenmodes of $\underline{H}$, which typically provides better performance than simply transmitting data from the T transmit antennas without any spatial processing. The receiving station uses the eigenvectors in $\underline{E}$ to receive the data transmission on the eigenmode(s) of $\underline{H}$. Table 1 shows the spatial processing performed by the transmitting station, the received symbols at the receiving station, and the spatial processing performed by the receiving station for eigensteering.

TABLE 1

| | Eigensteering | |
|---|---|---|
| Spatial Processing at Transmitting Station | Received Vector | Spatial Processing at Receiving Station |
| $x_{es} = \underline{E} \cdot \underline{s}$ | $\underline{r}_{es} = \underline{H} \cdot \underline{x}_{es} + \underline{n}$ | $\hat{\underline{s}}_{es} = \underline{\Lambda}^{-1} \cdot \underline{E}^H \cdot \underline{H}^H \cdot \underline{r}_{es}$ |

In Table 1, $\underline{s}$ is a T×1 vector with up to S data symbols to be transmitted on the S eigenmodes, $\underline{x}_{es}$ is a T×1 vector with T transmit symbols to be sent from the T transmit antennas, $\underline{r}_{es}$ is an R×1 vector with R received symbols obtained from the R receive antennas, $\underline{n}$ is an R×1 noise vector, and $\hat{\underline{s}}_{es}$ is a T×1 vector with up to S detected data symbols, which are estimates of the transmitted data symbols in s.

If only the principal eigenmode is used for data transmission, then the array gain may be estimated based on the eigenvalue $\lambda_{pem}$ for the principal eigenmode, as follows:

$$G_{pem,dB} = 10 \cdot \log_{10}(\lambda_{pem}),  \quad \text{Eq (14)}$$

where $G_{pem,dB}$ is the array gain for the principal eigenmode given in units of dB. The principal eigenvalue $\lambda_{pem}$ is typically less than the number of transmit antennas, or $\lambda_{pem} < T$. The array gain may be limited to a predetermined value, e.g., $G_{perm,dB} \leq 4$ dB or some other value.

The total transmit power may then be limited using equations (11) and (14), as follows:

$$P_{tx,dBm} \leq EIRP_{limit,dBm} - G_{pem,dB} - G_{ant,dBi}, \quad \text{Eq (15)}$$

If multiple eigenmodes are used for data transmission, then the transmit power is radiated in different spatial directions determined by the eigenvectors for these eigenmodes. The array gain may be estimated based on the eigenvalues for the eigenmodes used for data transmission, as follows:

$$G_{mem,dB} = 10 \cdot \log_{10}\left(\frac{1}{M}\sum_{m=1}^{M}\lambda_m\right), \quad \text{Eq (16)}$$

where
M is the number of eigenmodes used for data transmission; and
$G_{mem,dB}$ is the array gain for the multiple eigenmodes given in units of dB.

The total transmit power may then be limited as shown follows:

$$P_{tx,dBm} \leq EIRP_{limit,dBm} - G_{mem,dB} - G_{ant,dBi}, \quad \text{Eq (17)}$$

Equation (17) is similar to equation (15), with the array gain $G_{mem,dB}$ for the multiple eigenmodes replacing the array gain $G_{pem,dB}$ for the principal eigenmode. Comparing equations (11), (15) and (17), since $G_{pem,dB} < G_{mem,dB} < 10 \cdot \log_{10}(T)$ in most instances, higher transmit power may be used for data transmission on one or multiple eigenmodes to achieve better system performance.

Network 100 may utilize a multi-carrier modulation technique such as orthogonal frequency division multiplexing (OFDM). OFDM effectively partitions the overall system bandwidth into multiple (K) orthogonal frequency subbands, which are also called tones, subcarriers, bins, and frequency channels. With OFDM, each subband is associated with a respective subcarrier that may be modulated with data.

For a MIMO network that utilizes OFDM (or a MIMO-OFDM network), a channel response matrix $\underline{H}(k)$ may be obtained for each subband k and decomposed to obtain a matrix $\underline{E}(k)$ of eigenvectors and a matrix $\underline{\Lambda}(k)$ of eigenvalues for that subband. The eigenvalues for each subband may be ordered from largest to smallest, and the eigenvectors for that subband may be ordered correspondingly.

Figure 2:
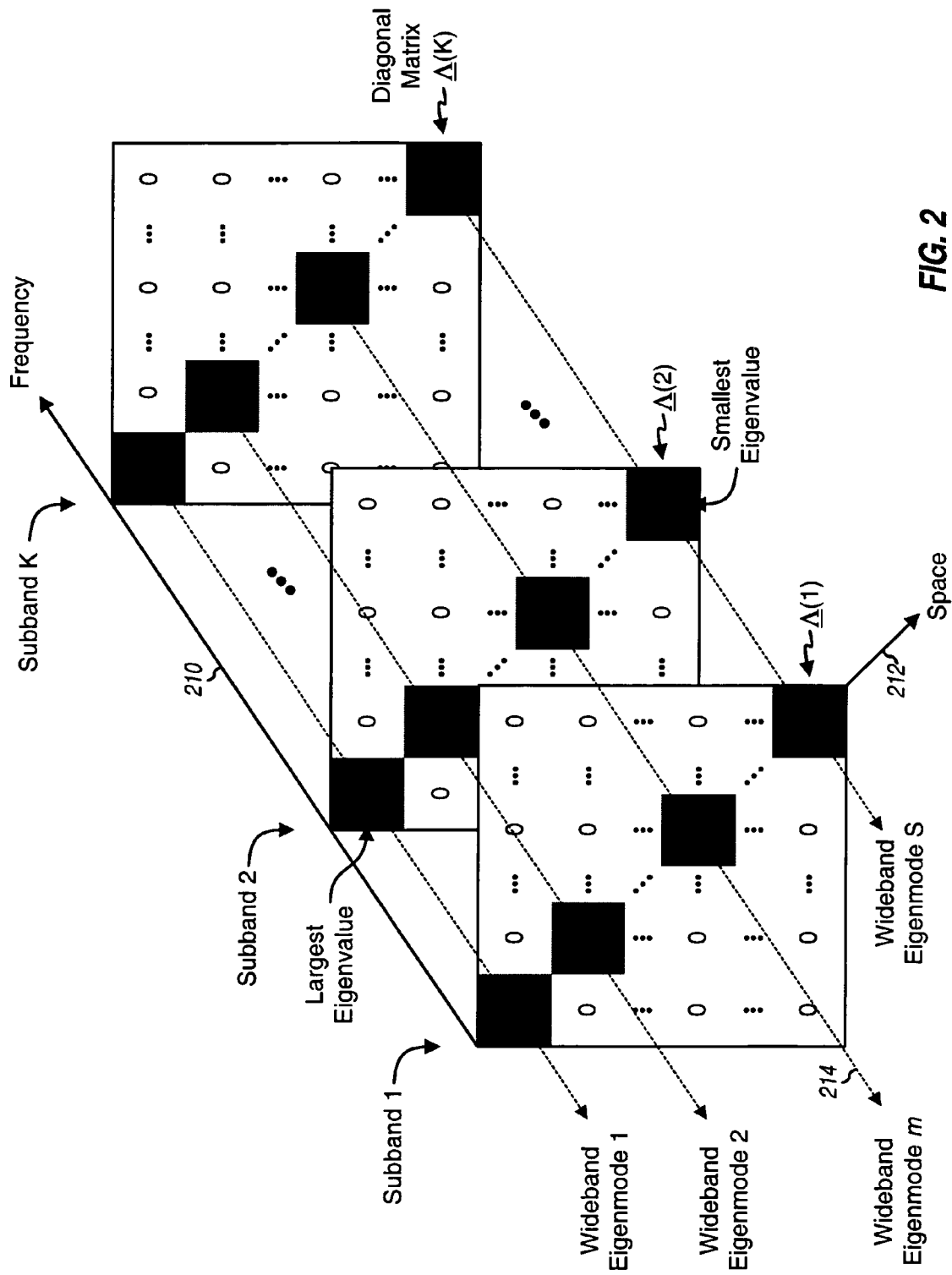
FIG. 2 illustrates the results of eigenvalue decomposition for multiple subbands.

FIG. 2 graphically illustrates the results of the eigenvalue decomposition for the K subbands in the MIMO-OFDM network. A set of K diagonal matrices, $\underline{\Lambda}(k)$ for k=1, ..., K, is shown along an axis 210 that represents the frequency dimension. The S eigenvalues, $\lambda_m(k)$ for m=1, ..., S, of each matrix $\underline{\Lambda}(k)$ are located along the diagonal of the matrix. Axis 212 runs along the diagonal of each matrix $\underline{\Lambda}(k)$ and represents the spatial dimension. A wideband eigenmode m is formed by eigenmode m for all K subbands. Wideband eigenmode m is associated with a set of K eigenvalues, $\lambda_m(k)$ for k=1, ..., K, which is indicative of the frequency response across the K subbands of that wideband eigenmode. The principal wideband eigenmode is associated with the largest eigenvalue $\lambda_1(k)$ for each of the K subbands. The set of eigenvalues for each wideband eigenmode is shown by the shaded boxes along a dashed line 214. For each wideband eigenmode that experiences frequency selective fading, the eigenvalues for that wideband eigenmode may be different for different values of k.

For the MIMO-OFDM network, the transmitting and receiving stations may perform the spatial processing shown in Table 1 for each subband used for data transmission.

If only the principal wideband eigenmode is used for data transmission, then the array gain may be estimated based on the largest eigenvalue for all K subbands of the principal wideband eigenmode, as follows:

$$G_{pwem,dB} = 10 \cdot \log_{10}\{\max_{k}\lambda_{pem}(k)\}, \quad \text{Eq (18)}$$

where $G_{pwem,dB}$ is the array gain for the principal wideband eigenmode. Alternatively, the array gain may be estimated based on the average of the K eigenvalues for the principal wideband eigenmode, as follows:

$$G_{pwem,dB} = 10 \cdot \log_{10}\left(\frac{1}{K}\sum_{k=1}^{K}\lambda_{pem}(k)\right). \quad \text{Eq (19)}$$

The total transmit power may then be limited as shown in equation (15), albeit with the array gain $G_{pwem,dB}$ for the principal wideband eigenmode replacing the array gain $G_{pem,dB}$ for the principal eigenmode.

If multiple wideband eigenmodes are used for data transmission, then the transmit power is radiated in different spatial directions determined by the eigenvectors for these wideband eigenmodes. The array gain may be estimated based on the eigenvalues for the wideband eigenmodes used for data transmission, as follows:

$$G_{mwem,dB} = 10 \cdot \log_{10}\left(\frac{1}{M \cdot K}\cdot\sum_{m=1}^{M}\sum_{k=1}^{K}\lambda_m(k)\right), \quad \text{Eq (20)}$$

where $G_{mwem,dB}$ is the array gain for multiple wideband eigenmodes. The transmit power may then be limited as shown in equation (17), albeit with the array gain $G_{mwem,dB}$ for the multiple wideband eigenmodes replacing the array gain $G_{mem,dB}$ for the multiple eigenmodes.

The transmitting station may also transmit data using spatial spreading to improve diversity. Spatial spreading refers to the transmission of a symbol from multiple transmit antennas simultaneously, possibly with different amplitudes and/or phases determined by a steering vector used for that symbol. Spatial spreading is also called steering diversity, transmit steering, pseudo-random transmit steering, and so on. Table 2 shows the spatial processing performed by the transmitting station, the received symbols at the receiving station, and the spatial processing performed by the receiving station for spatial spreading.

TABLE 2

Spatial Spreading

| Spatial Processing at Transmitting Station | Received Vector | Spatial Processing at Receiving Station |
|---|---|---|
| $\underline{x}_{ss} = \underline{V} \cdot \underline{s}$ | $\underline{r}_{ss} = \underline{H} \cdot \underline{x}_{ss} + \underline{n}$ | $\underline{\hat{s}}_{ss} = \underline{D}_x \cdot \underline{M}_x \cdot \underline{r}_{ss}$ |

In Table 2, $\underline{s}$ is a T×1 data vector, $\underline{x}_{ss}$ is a T×1 transmit vector, $\underline{r}_{ss}$ is an R×1 received vector, $\underline{\hat{s}}_{ss}$ is a T×1 detected vector, $\underline{V}$ is a T×T steering matrix for spatial spreading, $\underline{M}_x$ is a T×R spatial filter matrix, and $\underline{D}_x$ is a T×T diagonal matrix. The matrices $\underline{M}_x$ and $\underline{D}_x$ may be derived using, for example, a minimum mean square error (MMSE) technique or a channel correlation matrix inversion (CCMI) technique. For the MMSE technique, $\underline{M}_{mmse} = [\underline{H}_{eff}^H \cdot \underline{H}_{eff} + \sigma_n^2 \underline{I}]^{-1} \cdot \underline{H}_{eff}^H$ and $\underline{D}_{mmse} = [\text{diag } [\underline{M}_{mmse} \cdot \underline{H}_{eff}]]^{-1}$, where $\underline{H}_{eff} = \underline{H} \cdot \underline{V}$ and $\sigma_n^2$ is the variance of the noise. For the CCMI technique, $\underline{M}_{ccmi} = [\underline{H}_{eff}^H \cdot \underline{H}_{eff}]^{-1} \cdot \underline{H}_{eff}^H$ and $\underline{D}_{ccmi} = \underline{I}$.

With spatial spreading, the transmitting station performs spatial processing with different steering matrices $\underline{V}$ across time and/or frequency dimensions so that the data transmission observes an ensemble of effective channels. The steering matrices may be pseudo-random matrices, matrices generated with a base matrix (e.g., a Walsh matrix or a Fourier matrix) and different combinations of scalars (e.g., 1, −1, +j, and −j) for the rows of the base matrix, or some other matrices.

For data transmission with spatial spreading, the array gain may be estimated as $G_{array,dB}^{ss} = 0$ dB or may be set to some other value. The transmit power may then be limited as shown in equation (15), albeit with the array gain $G_{array,dB}^{ss}$ for spatial spreading replacing the array gain $G_{pem,dB}$ for the principal eigenmode.

Figure 3:
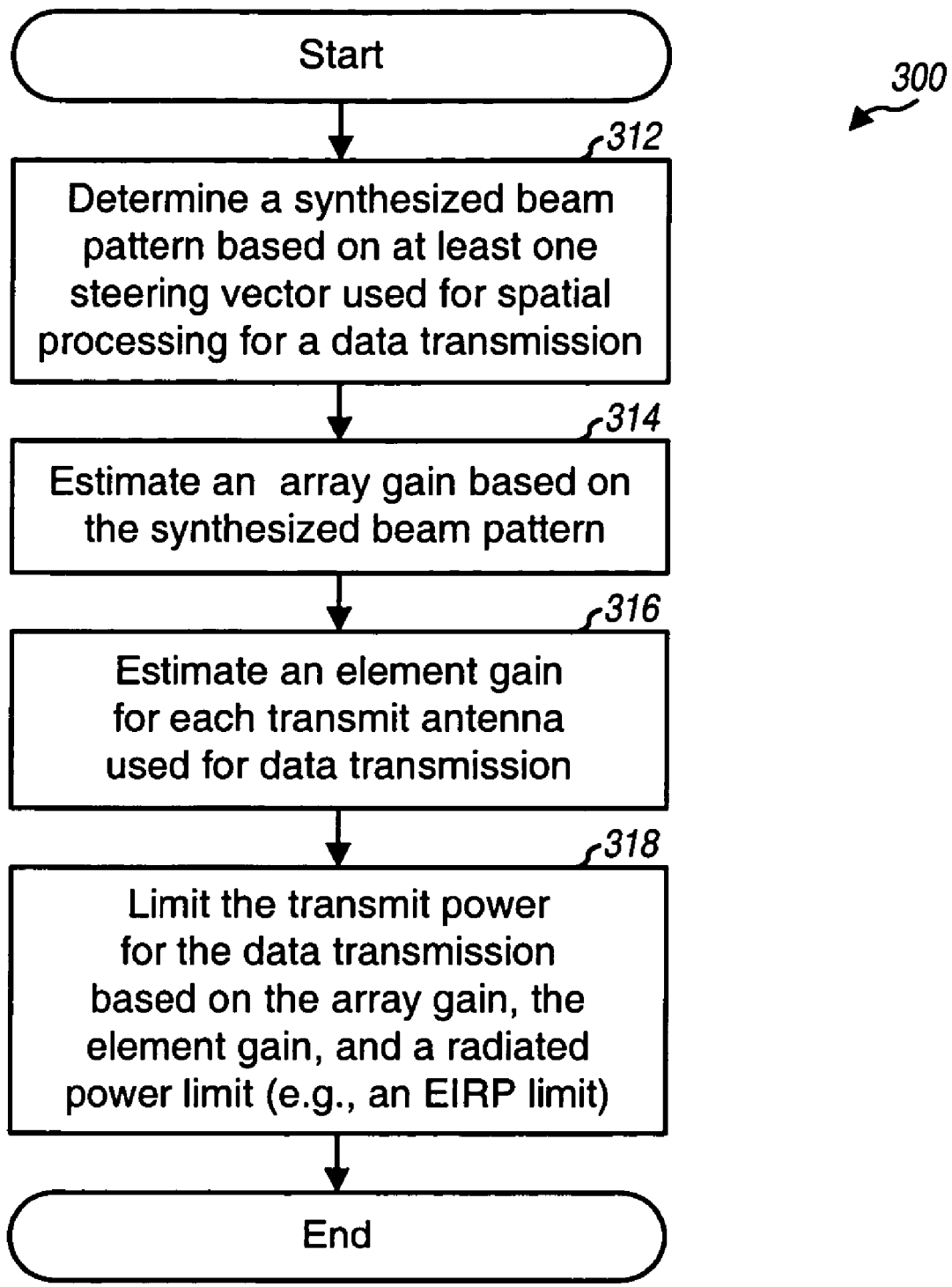
FIG. 3 shows a process for controlling the radiated power for a data transmission.

FIG. 3 shows a process 300 for controlling the radiated power for a data transmission sent from multiple transmit antennas. A synthesized antenna pattern is determined based on at least one steering vector used for spatial processing for the data transmission (block 312). Different spatial processing modes or techniques have different synthesized antenna patterns. For example, eigensteering generates a synthesized antenna pattern that is directed toward the receiving station whereas spatial spreading generates a spatially spread synthesized antenna pattern. In any case, an array gain is estimated based on the synthesized antenna pattern (block 314). The array gain may be estimated based on the spatial processing mode used for the data transmission and applicable parameters (e.g., eigenvalues) for that mode. For eigensteering, the array gain may be estimated based on the eigenvalue for the principal eigenmode, the largest or average eigenvalue for the principal wideband eigenmode, multiple eigenvalues for multiple subbands of at least one wideband eigenmode, and so on. For spatial spreading, the array gain may be set to a predetermined value (e.g., 0 dB). The array gain may also be set to different predetermined values for different spatial spreading modes. For example, the array gain may be set to a first value (e.g., from 0 to 4 dB) for eigensteering depending on number of eigenmodes used, and to a second value (e.g., 0 dB) for spatial spreading. An element gain for each transmit antenna used for data transmission may also be ascertained or estimated (block 316). The transmit power for the data transmission is then limited based on the array gain, the element gain, and a radiated power limit (e.g., an EIRP limit) (block 318).

Figure 4:
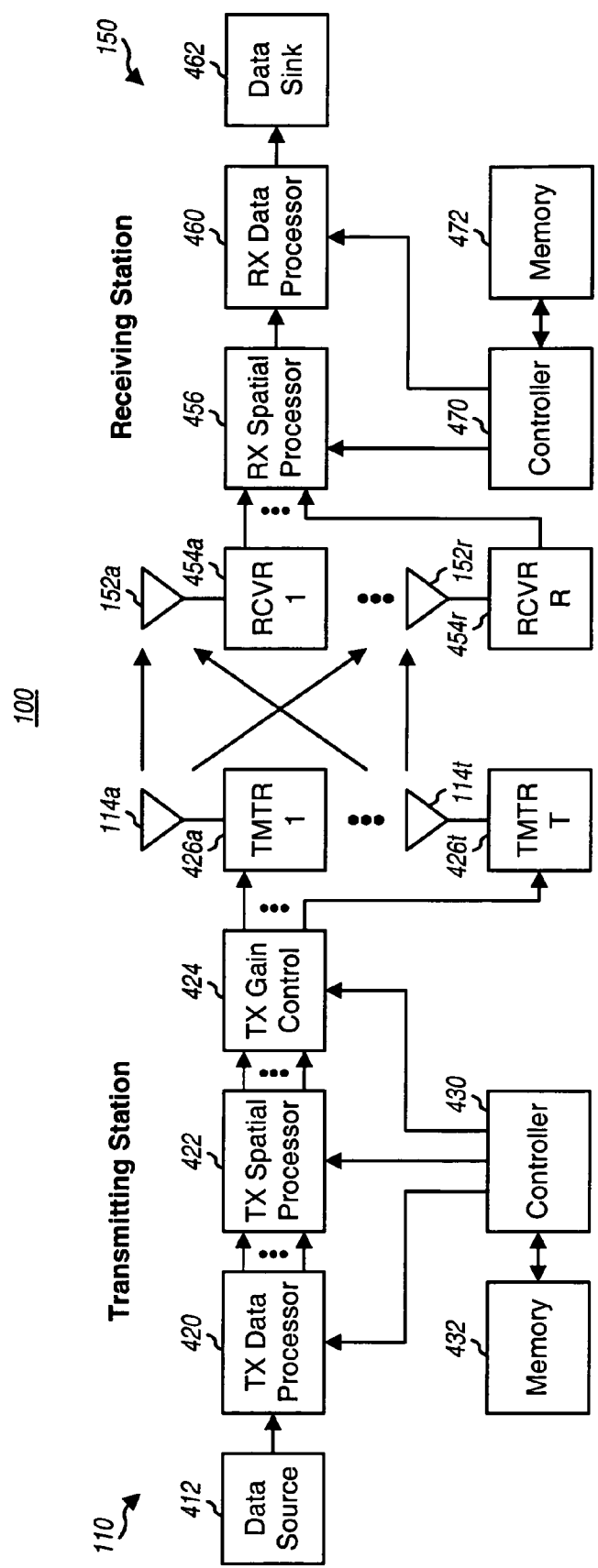
FIG. 4 shows a block diagram of the transmitting and receiving stations.

FIG. 4 shows a block diagram of transmitting station 110 and receiving station 150 in network 100. Transmitting station 110 may be an access point or a user terminal. Receiving station 150 may also be an access point or a user terminal.

At transmitting station 110, a transmit (TX) data processor 420 receives traffic data from a data source 412 and processes (e.g., encodes, interleaves, and symbol maps) the traffic data to generate data symbols, which are modulation symbols for data. A TX spatial processor 422 receives the data symbols from TX data processor 420, multiplexes in pilot symbols, performs spatial processing (e.g., as shown in Tables 1 and 2 for eigensteering and spatial spreading, respectively), and provides T streams of transmit symbols to a TX gain control unit 424. Unit 424 scales the transmit symbols such that the total transmit power $P_{tx,dBm}$ ensures compliance with the EIRP limit $EIRP_{limit,dBm}$, e.g., as shown in equation (11), (15), or (17). Unit 424 provides T scaled transmit symbol streams to T transmitter units (TMTR) 426a through 426t. Each transmitter unit 426 performs OFDM modulation (if applicable) to generate data chips, and further processes (e.g., converts to analog, amplifies, filters, and frequency upconverts) its data chips to generate a modulated signal. Transmitter units 426a through 426t provide T modulated signals for transmission from T antennas 114a through 114t, respectively.

At receiving station 150, R antennas 152a through 152r receive the T transmitted signals, and each antenna 152 provides a received signal to a respective receiver unit (RCVR) 454. Each receiver unit 454 processes its received signal and provides a stream of received symbols to a receive (RX) spatial processor 456. RX spatial processor 456 performs receiver spatial processing (or spatial matched filtering) on the received symbols from all R receiver units 454 (e.g., as shown in Tables 1 and 2) and provides detected data symbols. An RX data processor 460 then processes (e.g., symbol demaps, deinterleaves, and decodes) the detected data symbols and provides decoded data to a data sink 462.

Controllers 430 and 470 control the operation of the processing units at transmitting station 110 and receiving station 150, respectively. Memory units 432 and 472 store data and/or program codes used by controllers 430 and 470, respectively.

For a TDD network, receiving station 150 may transmit a pilot to transmitting station 110. Transmitting station 110 may derive a channel response matrix for each subband used for data transmission and decompose each channel response matrix to obtain the eigenvalues and eigenvectors for that subband. Transmitting station 110 may perform (1) spatial processing for eigensteering based on the eigenvectors, (2) spatial processing for spatial spreading based on steering matrices, (3) spatial processing based on some other technique, or (3) no spatial processing at all. Controller 430 may perform process 300 in FIG. 3, determine the synthesized antenna pattern based on the steering vectors used for spatial processing, estimate the array gain based on the synthesized antenna pattern, estimate the element gain for each transmit antenna, and limit the transmit power based on the array gain, the element gain, and the EIRP limit.

The techniques described herein allow the transmitting station to estimate the array gain based on the synthesized antenna pattern formed by the steering vectors used for data transmission. The transmit power for the data transmission is then limited (e.g., by scaling the steering vectors and/or adjusting the transmit power applied to each antenna) to ensure that the EIRP limits are met regardless of the channel characteristics.

The radiated power control techniques described herein may be implemented by various means. For example, these techniques may be implemented in hardware, software, or a combination thereof. For a hardware implementation, the processing units used to control the radiated power may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the radiated power control techniques may be implemented with modules (e.g., procedures, functions, and so on) that perform the functions described herein. The software codes may be stored in a memory unit (e.g., memory unit 432 in FIG. 4) and executed by a processor (e.g., controller 430). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of controlling radiated power for a data transmission utilizing spatial processing, comprising:
    estimating an array gain based on a synthesized antenna pattern for the data transmission and a spatial processing mode; and
    limiting the transmit power for the data transmission based on the array gain and a radiated power limit.

2. The method of claim 1, further comprising:
    determining the synthesized antenna pattern based on at least one steering vector used for spatial processing for the data transmission.

3. The method of claim 1, wherein the estimating the array gain based on the synthesized antenna pattern comprises
    determining an eigenvalue for a spatial channel used for the data transmission, and
    deriving the array gain based on the eigenvalue.

4. The method of claim 1, wherein the estimating the array gain based on the synthesized antenna pattern comprises
    determining a plurality of eigenvalues for a plurality of spatial channels used for the data transmission, and
    deriving the array gain based on the plurality of eigenvalues.

5. The method of claim 1, wherein the estimating the array gain based on the synthesized antenna pattern comprises
    determining a plurality of eigenvalues for a plurality of frequency subbands of at least one wideband spatial channel-used for the data transmission, and
    deriving the array gain based on the plurality of eigenvalues.

6. The method of claim 1, wherein the estimating the array gain based on the synthesized antenna pattern comprises
    determining a plurality of eigenvalues for a plurality of frequency subbands of a wideband spatial channel used for the data transmission, and
    deriving the array gain based on a largest eigenvalue among the plurality of eigenvalues.

7. The method of claim 1, wherein the estimating the array gain based on the synthesized antenna pattern comprises
    determining a plurality of eigenvalues for a plurality of frequency subbands of a wideband spatial channel used for the data transmission, and
    deriving the array gain based on an average of the plurality of eigenvalues.

8. The method of claim 1, wherein the estimating the array gain based on the synthesized antenna pattern comprises
    setting the array gain to a predetermined value if the synthesized antenna pattern is a spatially spread synthesized antenna pattern.

9. The method of claim 1, wherein the estimating the array gain based on the synthesized antenna pattern comprises
    determining a spatial processing mode used for the data transmission, and
    setting the array gain to a predetermined value for the spatial processing mode used for the data transmission.

10. The method of claim 1, further comprising:
    estimating an element gain for each of a plurality of antennas used for the data transmission, and wherein the transmit power for the data transmission is limited further based on the element gain.

11. The method of claim 1, wherein the radiated power limit is an effective isotropic radiated power (EIRP) limit.

12. An apparatus for data transmission utilizing spatial processing in a wireless communication network, comprising:
    a controller to estimate an array gain based on a synthesized antenna pattern for a data transmission and a spatial processing mode; and
    a control unit to limit transmit power for the data transmission based on the array gain and a radiated power limit.

13. The apparatus of claim 12, wherein the controller determines the synthesized antenna pattern based on at least one steering vector used for spatial processing for the data transmission.

14. The apparatus of claim 12, wherein the controller determines at least one eigenvalue for at least one spatial channel used for the data transmission and derives the array gain based on the at least one eigenvalue.

15. The apparatus of claim 12, wherein the controller determines a plurality of eigenvalues for a plurality of frequency subbands of at least one wideband spatial channel used for the data transmission and derives the array gain based on the plurality of eigenvalues.

16. The apparatus of claim 12, wherein the controller sets the array gain to a predetermined value if the synthesized antenna pattern is a spatially spread synthesized antenna pattern.

17. The apparatus of claim 12, wherein the controller estimates an element gain for each of a plurality of antennas used for data transmission, and wherein the processor limits the transmit power for the data transmission further based on the element gain.

18. An apparatus for data transmission utilizing spatial processing in a wireless communication network, comprising:
    means for estimating an array gain based on a synthesized antenna pattern for a data transmission and a spatial processing mode; and
    means for limiting transmit power for the data transmission based on the array gain and a radiated power limit.

19. The apparatus of claim 18, further comprising:
    means for determining the synthesized antenna pattern based on at least one steering vector used for spatial processing for the data transmission.

20. The apparatus of claim 18, wherein the means for estimating the array gain based on the synthesized antenna pattern comprises
  means for determining at least one eigenvalue for at least one spatial channel used for the data transmission, and
  means for deriving the array gain based on the at least one eigenvalue.

21. The apparatus of claim 18, wherein the means for estimating the array gain based on the synthesized antenna pattern comprises
  means for determining a plurality of eigenvalues for a plurality of frequency subbands of at least one wideband spatial channel used for the data transmission, and
  means for deriving the array gain based on the plurality of eigenvalues.

22. The apparatus of claim 18, wherein the means for estimating the array gain based on the synthesized antenna pattern comprises
  means for setting the array gain to a predetermined value if the synthesized antenna pattern is a spatially spread synthesized antenna pattern.

23. The apparatus of claim 18, further comprising:
  means for estimating an element gain for each of a plurality of antennas used for data transmission, and wherein the transmit power for the data transmission is limited further based on the element gain.

24. A computer-program product for controlling radiated power for a data transmission utilizing spatial processing, the computer-program product comprising a non-transitory computer readable medium having a set of instructions stored thereon, the set of instructions being executable by one or more processors and the set of instructions comprising:
  instructions for estimating an array gain based on a synthesized antenna pattern for the data transmission and a spatial processing mode; and
  instructions for limiting the transmit power for the data transmission based on the array gain and a radiated power limit.

25. The computer-program product of claim 24, wherein the set of instructions further comprises:
  instructions for determining the synthesized antenna pattern based on at least one steering vector used for spatial processing for the data transmission.

26. The computer-program product of claim 24, wherein the instructions for estimating the array gain based on the synthesized antenna pattern comprise
  instructions for determining an eigenvalue for a spatial channel used for the data transmission, and
  instructions for deriving the array gain based on the eigenvalue.

27. The computer-program product of claim 24, wherein the instructions for estimating the array gain based on the synthesized antenna pattern comprise
  instructions for determining a plurality of eigenvalues for a plurality of spatial channels used for the data transmission, and
  instructions for deriving the array gain based on the plurality of eigenvalues.

28. The computer-program product of claim 24, wherein the instructions for estimating the array gain based on the synthesized antenna pattern comprise
  instructions for determining a plurality of eigenvalues for a plurality of frequency subbands of at least one wideband spatial channel-used for the data transmission, and
  instructions for deriving the array gain based on the plurality of eigenvalues.

29. The computer-program product of claim 24, wherein the instructions for estimating the array gain based on the synthesized antenna pattern comprise
  instructions for determining a plurality of eigenvalues for a plurality of frequency subbands of a wideband spatial channel used for the data transmission, and
  instructions for deriving the array gain based on a largest eigenvalue among the plurality of eigenvalues.

30. The computer-program product of claim 24, wherein the instructions for estimating the array gain based on the synthesized antenna pattern comprise
  instructions for determining a plurality of eigenvalues for a plurality of frequency subbands of a wideband spatial channel used for the data transmission, and
  instructions for deriving the array gain based on an average of the plurality of eigenvalues.

31. The computer-program product of claim 24, wherein the instructions for estimating the array gain based on the synthesized antenna pattern comprise
  instructions for setting the array gain to a predetermined value if the synthesized antenna pattern is a spatially spread synthesized antenna pattern.

32. The computer-program product of claim 24, wherein the instructions for estimating the array gain based on the synthesized antenna pattern comprise
  instructions for determining a spatial processing mode used for the data transmission, and
  instructions for setting the array gain to a predetermined value for the spatial processing mode used for the data transmission.

33. The computer-program product of claim 24, wherein the set of instructions further comprise:
  instructions for estimating an element gain for each of a plurality of antennas used for the data transmission, and wherein the transmit power for the data transmission is limited further based on the element gain.

34. The computer-program product of claim 24, wherein the radiated power limit is an effective isotropic radiated power (EIRP) limit.

* * * * *